United States Patent
Sun et al.

(10) Patent No.: US 9,115,626 B2
(45) Date of Patent: Aug. 25, 2015

(54) KINETICS-BASED SCR CONTROL MODEL IMPROVEMENT

(75) Inventors: Min Sun, Troy, MI (US); Igor Zanetti, Verrayes (IT); Paul Jasinkiewicz, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 370 days.

(21) Appl. No.: 13/545,246

(22) Filed: Jul. 10, 2012

(65) Prior Publication Data

US 2014/0013725 A1    Jan. 16, 2014

(51) Int. Cl.
*F01N 3/00* (2006.01)
*F01N 3/02* (2006.01)
*F01N 3/10* (2006.01)
*F01N 3/20* (2006.01)

(52) U.S. Cl.
CPC ............. *F01N 3/208* (2013.01); *F01N 2610/02* (2013.01); *F01N 2900/0406* (2013.01); *F01N 2900/0601* (2013.01); *F01N 2900/1621* (2013.01); *F01N 2900/1622* (2013.01); *Y02T 10/24* (2013.01)

(58) Field of Classification Search
USPC .............................. 60/274, 277, 295, 299, 301
See application file for complete search history.

(56) References Cited

U.S. PATENT DOCUMENTS

| | | | | |
|---|---|---|---|---|
| 6,415,602 | B1 * | 7/2002 | Patchett et al. | 60/286 |
| 6,581,374 | B2 * | 6/2003 | Patchett et al. | 60/286 |
| 2010/0326052 | A1 | 12/2010 | Sun | |
| 2012/0117954 | A1 * | 5/2012 | Yasui et al. | 60/301 |
| 2012/0124967 | A1 * | 5/2012 | Yang et al. | 60/274 |
| 2012/0137660 | A1 * | 6/2012 | Yan et al. | 60/276 |
| 2012/0174562 | A1 * | 7/2012 | Itoh | 60/274 |
| 2012/0186232 | A1 * | 7/2012 | Kim et al. | 60/274 |
| 2012/0192549 | A1 * | 8/2012 | Sakurai | 60/285 |

* cited by examiner

*Primary Examiner* — Audrey K Bradley
*Assistant Examiner* — Dapinder Singh

(57) ABSTRACT

A method for monitoring a discrete substrate element from an ammonia-selective catalyst reduction device configured to treat an exhaust gas feedstream of an internal combustion engine includes monitoring amounts of ammonia that are adsorbed, desorbed, and oxidized and an amount of ammonia that is consumed in reducing NOx in the exhaust gas feedstream from the discrete substrate element. An amount of ammonia consumption for the discrete substrate element is determined based on the amount of ammonia that is oxidized and the amount of ammonia that is consumed in reducing NOx in the exhaust gas feedstream. The amount of ammonia that is adsorbed and the amount of ammonia that is desorbed for the discrete substrate element are compared and the amount of ammonia consumption for the discrete substrate element is adjusted when the amount of ammonia that is adsorbed is less than the amount of ammonia that is desorbed.

11 Claims, 3 Drawing Sheets

KINETICS-BASED SCR CONTROL MODEL IMPROVEMENT

TECHNICAL FIELD

This disclosure is related to exhaust aftertreatment systems for internal combustion engines.

BACKGROUND

The statements in this section merely provide background information related to the present disclosure. Accordingly, such statements are not intended to constitute an admission of prior art.

Known engine control strategies to improve fuel economy and reduce fuel consumption in internal combustion engines include operating at a lean air/fuel ratio. This includes control strategies for engines configured to operate in compression-ignition and lean-burn spark-ignition combustion modes. Engines operating at lean air/fuel ratios can have increased local combustion temperatures leading to increased NOx emissions.

A known exhaust aftertreatment system and control strategy for managing and reducing NOx emissions includes a urea injection control system and an associated ammonia-selective catalytic reduction device. The urea injection control system injects a reductant, e.g., urea into an exhaust gas feedstream upstream of the ammonia-selective catalytic reduction device. The injected urea decomposes to ammonia, which reacts with NOx in the presence of a catalyst to produce nitrogen. Some amount of ammonia can be stored on the ammonia-selective catalytic reduction device, enabling continued NOx reduction when the urea injection control system is not capable of dispensing a controlled amount of urea. Known control systems include dispensing urea at a rate that corresponds to concentrations of engine-out NOx emissions to achieve NOx reduction without using excess amounts of urea, i.e., at a urea/NOx stoichiometric ratio.

SUMMARY

A method for monitoring a discrete substrate element from an ammonia-selective catalyst reduction device configured to treat an exhaust gas feedstream of an internal combustion engine includes monitoring an amount of ammonia that is adsorbed, an amount of ammonia that is desorbed, an amount of ammonia that is oxidized and an amount of ammonia that is consumed in reducing NOx in the exhaust gas feedstream from the discrete substrate element. An amount of ammonia consumption for the discrete substrate element is determined based on the amount of ammonia that is oxidized and the amount of ammonia that is consumed in reducing NOx in the exhaust gas feedstream. The amount of ammonia that is adsorbed and the amount of ammonia that is desorbed for the discrete substrate element are compared and the amount of ammonia consumption for the discrete substrate element is adjusted when the amount of ammonia that is adsorbed is less than the amount of ammonia that is desorbed.

BRIEF DESCRIPTION OF THE DRAWINGS

One or more embodiments will now be described, by way of example, with reference to the accompanying drawings, in which.

DETAILED DESCRIPTION

Figure 1:
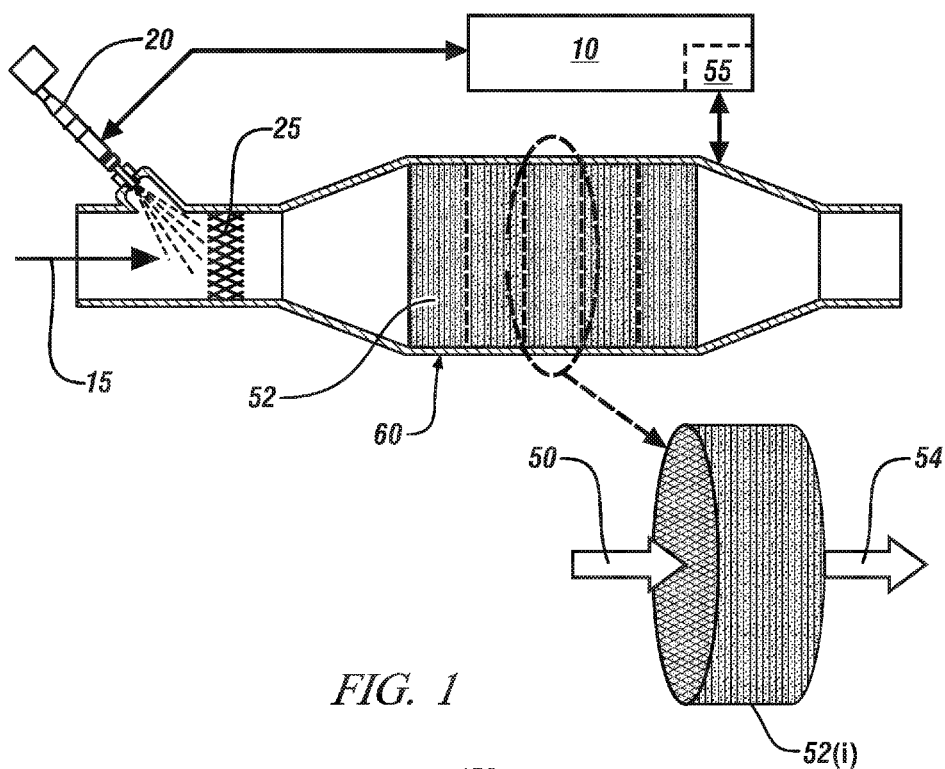
FIG. 1 illustrates an ammonia-selective catalytic reduction device of an exhaust aftertreatment system, in accordance with the present disclosure.

Referring now to the drawings, wherein the showings are for the purpose of illustrating certain exemplary embodiments only and not for the purpose of limiting the same, FIG. 1 schematically illustrates an exhaust aftertreatment device 60 for treating an exhaust gas feedstream output from an internal combustion engine, including an internal combustion engine that operates lean of stoichiometry. It is appreciated that the internal combustion engine can include an engine configured to operate in a compression-ignition combustion mode, an engine configured to operate in a lean-burn spark-ignition combustion mode, and an engine configured to operate in a homogeneous-charge compression ignition combustion mode. The exhaust aftertreatment device 60 described herein is an ammonia-selective catalytic reduction device (NH3-SCR device) including a coated substrate 52.

It is appreciated that the NH3-SCR device 60 is an element of an exhaust aftertreatment system that may include other aftertreatment devices. In one embodiment the exhaust aftertreatment system can include a plurality of aftertreatment devices each of which includes a device that employs technologies having various capabilities for treating the constituent elements of the exhaust gas feedstream. Treating the constituents of the exhaust gas feedstream may include oxidation, selective catalytic reduction using a reductant, particulate filtering, and other treatments. Design features for each aftertreatment device include total volume, space velocity, cell density, washcoat materials, loading(s) of catalytic material(s), and vehicle/engine compartment locations, which are determined for specific applications. In one embodiment, a first aftertreatment device is a three-way catalyst that is located upstream of a second aftertreatment device (i.e. NH3-SCR device 60), which is located upstream of a third aftertreatment device that includes a catalyzed particulate filter, although the concepts described herein are not so limited. The first, second, and third aftertreatment devices are fluidly connected in series using known pipes and connectors. The first, second, and third aftertreatment devices can be assembled into individual structures that are fluidly connected and assembled in an engine compartment and a vehicle underbody with one or more sensing devices placed therebetween.

The exemplary NH3-SCR device 60 is depicted using a two-dimensional schematic model with an exhaust gas feedstream flowing therethrough. In one embodiment there is a urea injection device 20 and associated urea delivery system upstream of a mixer device 25 that is upstream of the NH3-SCR device 60. The NH3-SCR device 60 includes one or more ceramic coated substrates 52 preferably fabricated from cordierite material and having a multiplicity of flowthrough passageways that are coated with washcoat and catalytic materials to store ammonia for reacting with NOx molecules present in the exhaust gas feedstream. It is appreciated that ammonia storage concentration ($\theta_{NH3}$) may be unevenly distributed along a flow axis of the coated substrate(s) 52.

A control module 10 is configured to monitor and control engine operation and monitor the exhaust gas feedstream. The control module 10 monitors or otherwise determines states of parameters of the exhaust gas feedstream. The control module 10 controls operation of the urea injection device 20. The control module 10 includes a virtual sensor 55 configured to estimate ammonia storage concentration ($\theta_{NH3}$) on the coated substrate 52 during ongoing operation of the engine. The virtual sensor 55 is achieved by executing routines and a plurality of predetermined calibration arrays that temporally determine the ammonia storage concentration ($\theta_{NH3}$) stored on the coated substrate 52. The virtual sensor 55 is described in detail with reference to FIG. 2. The ammonia storage concentration ($\theta_{NH3}$) is preferably expressed as a ratio of stored ammonia to a maximum ammonia storage capacity for the coated substrate 52 or portion thereof, and can be in terms of mass/mass, moles/moles, or other suitable measurement.

The control module 10 is configured to monitor or otherwise determine states of parameters of the exhaust gas feedstream flowing into the NH3-SCR device 60. Preferred parameters of the exhaust gas feedstream include an inlet temperature of the exhaust gas feedstream, pressure, mass flowrate, oxygen concentration, NOx concentrations, and other parameters from which concentrations of input gases including nitrogen oxide, nitrogen dioxide, nitrous oxide, oxygen, and ammonia can be determined, as is appreciated by one skilled in the art. The substrate temperature $T_{sub}$ can be monitored with a temperature sensor or determined by executing a mathematical model based upon the parameters of the exhaust gas feedstream and catalytic reaction rates of the coated substrate 52.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

The coated substrate(s) 52 is analytically segmented into a plurality of discrete elements 52($i$), i=1 through n, or bricks, positioned in series along a flow axis of the exhaust gas feedstream. Segmenting the coated substrate(s) 52 into the plurality of discrete elements provides an analytical framework for implementing the virtual sensor 55 to determine the ammonia storage concentration ($\theta_{NH3}$) on the NH3-SCR device 60 in real-time during ongoing operation of the engine.

FIG. 1 shows a single discrete substrate element 52($i$). Each discrete substrate element 52($i$) is characterized in terms of substrate operating temperature ($T_{sub}$) and the ammonia storage concentration ($\theta_{NH3}$). The exhaust gas feedstream passing through each discrete substrate element 52($i$) is characterized in terms of concentrations of input gases 50 including nitrogen oxide [NO]in, nitrogen dioxide [NO2]in, nitrous oxide [N2O]in, oxygen [O2]in, and ammonia [NH3]in, and corresponding output gases 54 including nitrogen oxide [NO], nitrogen dioxide [NO2], nitrous oxide [N2O], oxygen [O2], and ammonia [NH3].

Figure 2:
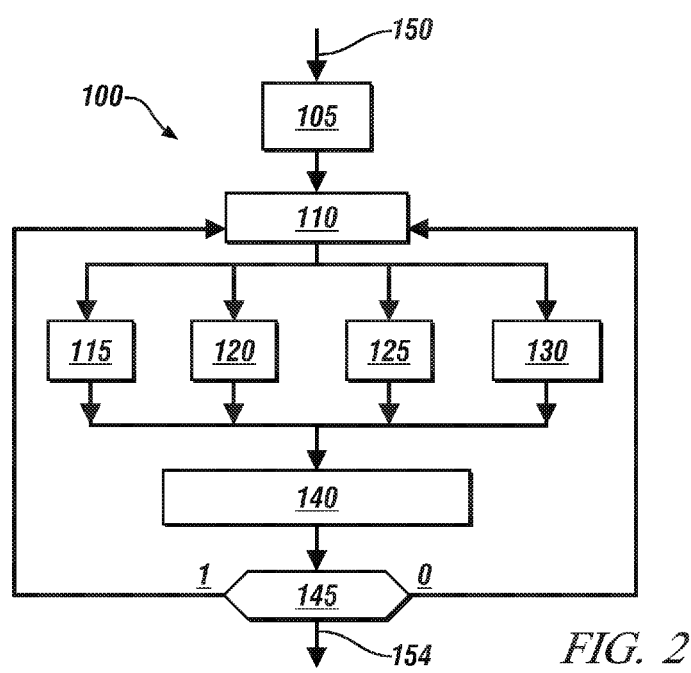
FIG. 2 illustrates a flowchart 100 for sequentially determining ammonia storage in a stepwise fashion for each of a plurality of discrete substrate elements over a time period for an ammonia-selective catalytic reduction device, in accordance with the present disclosure.

FIG. 2 illustrates a flowchart 100 for determining ammonia storage in a stepwise fashion for each of a plurality of discrete substrate elements over a time period for an ammonia-selective catalytic reduction device in accordance with the present disclosure. The flowchart 100 is an element of the virtual sensor 55 that is executed to determine ammonia storage concentration ($\theta_{NH3}$) for the total coated substrate 52. Other elements of the virtual sensor 55 are described herein. It is appreciated that the virtual sensor 55 can be reduced to a routine and executed in the control module 10 during ongoing engine operation to determine the ammonia storage concentration ($\theta_{NH3}$) for the entire coated substrate 52 in real-time. Table 1 is provided as a key to a flowchart 100 of FIG. 2 wherein the numerically labeled blocks and the corresponding functions are set forth as follows.

TABLE 1

| BLOCK | BLOCK CONTENTS |
|---|---|
| 105 | Monitoring states of input parameters 150 of exhaust gas feedstream including [NO]in, nitrogen dioxide [NO2]in, nitrous oxide [N20]in, oxygen [O2]in, ammonia and substrate temperature for each time period Δt. |
| 110 | Monitoring the states of input parameters for each discrete substrate element 52(i). |
| 115 | Determining for each discrete substrate element 52(i) an amount of ammonia that is adsorbed, Δ[NH3]$_{adsorption}$. The Δ[NH3]$_{adsorption}$ can also be described as an ammonia adsorption rate. |
| 120 | Determining for each discrete substrate element 52(i) an amount of ammonia that is desorbed, Δ[NH3]$_{desorption}$. The Δ[NH3]$_{desorption}$ can also be described as an ammonia desorption rate. |
| 125 | Determining for each discrete substrate element 52(i) an amount of ammonia that is oxidized, Δ[NH3]$_{oxidation}$. The Δ[NH3]$_{oxidation}$ can also be described as an ammonia oxidation rate. |
| 130 | Determining for each discrete substrate element 52(i) an amount of ammonia that is consumed, Δ[NH3]$_{NOx\_conversion}$, during reduction of NOx in the exhaust gas feedstream. The Δ[NH3]$_{NOx\_conversion}$ can also be described as an ammonia conversion rate. |
| 140 | Determining a change in ammonia storage concentration ($\theta_{NH3}$(i)) and concentrations of other chemical species for each of the discrete substrate elements 52(i) |
| 145 | Has the change in ammonia storage concentration ($\theta_{NH3}$(i)) for the last discrete substrate element 52(i) been determined? |

The flowchart 100 includes determining a change in ammonia storage for each of the discrete substrate elements 52($i$) over a time period and then determining the total ammonia storage concentration ($\theta_{NH3}$) on the coated substrate 52 based thereon. Determining a change in the ammonia storage concentration ($\theta_{NH3}$) includes sequentially determining a change in ammonia storage in a stepwise fashion for each of the discrete substrate elements 52($i$), i=1 through n, over a time period Δt based upon the concentrations of the input gases of nitrogen oxide [NO]in, nitrogen dioxide [NO2]in, nitrous oxide [N2O]in, oxygen [O2]in, and ammonia [NH3] in and substrate temperature. This includes determining, for each discrete substrate element 52(*i*) (110) for each time period $\Delta t$ (105), an amount of ammonia that is adsorbed (115), an amount of ammonia that is desorbed (120), an amount of ammonia that is oxidized (125), and an amount of ammonia that is consumed during reduction of NOx in the exhaust gas feedstream (130). The amounts of ammonia that is adsorbed (115), desorbed (120), oxidized (125), and consumed during reduction of NOx (130) can be in any suitable units of measure, including, e.g., mass, volume, or moles.

The change in the ammonia storage concentration ($\theta_{NH3}$) and concentrations of other chemical species are determined in a stepwise fashion for each of the discrete substrate elements 52(*i*) using the foregoing blocks 115, 120, 125 and 130 (140), which are repeated for each of the discrete substrate elements 52(*i*) for each time period $\Delta t$. An output for the discrete substrate element 52(*i*) is determined that includes corresponding concentrations of output gases 54 of nitrogen oxide [NO], nitrogen dioxide [NO2], nitrous oxide [N2O], ammonia [NH3], oxygen [O2], and a cumulative ammonia storage concentration [$\theta_{NH3}$]. The control module 10 can use the information to control engine fueling and air/fuel ratio for the exemplary powertrain system of FIG. 1 based upon inputs including the ammonia storage concentration ($\theta_{NH3}$) on the coated substrate 52 (NH3_storage).

The following set of relationships represents reaction chemistry occurring in each of the discrete substrate elements 52(*i*) of the coated substrate 52.

[1]

$$4NH_3 + 4NO + O_2 = 4N_2 + 6H_2O \quad (A)$$

$$2NH_3 + NO + NO_2 = 2N_2 + 3H_2O \quad (B)$$

$$8NH_3 + 6NO_2 = 7N_2 + 12H_2O \quad (C)$$

$$4NH_3 + 3O_2 = 2N_2 + 6H_2O \quad (D)$$

$$4NH_3 + 5O_2 = 4NO + 6H_2O \quad (E)$$

$$4NH_3 + 4NO + 3O_2 = 4N_2O + 6H_2O \quad (F)$$

$$2NH_3 + 2NO_2 = N_2O + N_2 + 3H_2O \quad (G)$$

$$2NH_3 + 2O_2 = N_2O + 3H_2O \quad (H)$$

The kinetic reactions and ammonia adsorption and desorption occur on the catalyst surface of one of the discrete substrate elements 52(*i*). The ammonia storage results from dynamic balance among the adsorption, desorption and kinetic reaction rates. For each of the discrete substrate elements 52(*i*), *i*=1 to n, the inlet parameter values are the outlet parameter values of the contiguous upstream discrete substrate element 52(*i*-1). The kinetic reaction rates rely on the ammonia storage concentration ($\theta_{NH3}$) and the other related chemical concentrations.

The amount of ammonia that is adsorbed (115), i.e., ammonia adsorption rate, can be determined in accordance with the following relationships:

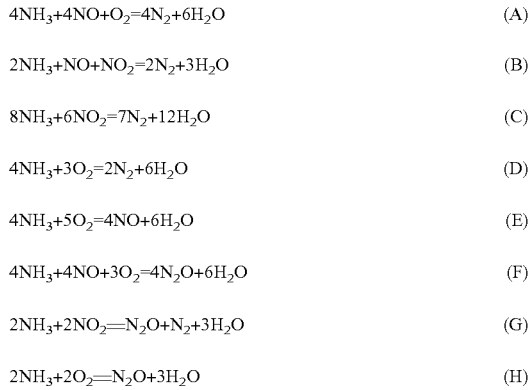

$$\Delta[NH3]_{adsorption} = \eta\_adsorption\left([NH3]_{in} + \frac{t_{resident}}{\Delta t}[NH3]_{-\Delta t} + \Delta[NH3]_{desorption}\right) \quad [2]$$

wherein an adsorption efficiency term $\eta_{adsorption}$ is preferably selected from a predetermined array $F_{table\_adsorp}(T_{sub}, \xi_{adsorp})$ that is stored in tabular form in the control module 10. A specific value for the adsorption efficiency term $\eta_{adsorption}$ correlates to substrate temperature $T_{sub}$ and an adsorption capacity term $\xi_{adsorp}$, which are set forth in the following relationships:

$$\eta_{adsorption} = F_{table\_adsorp}(T_{sub}, \xi_{adsorp}) \quad [3]$$

$$\xi_{adsorp} = (1 - \theta_{NH3}) * \Omega * \frac{t_{resident}}{\frac{t_{resident}}{\Delta t} + 1}$$

In the above relationships [1] and [2]:

[NH3]$_{-\Delta t}$ is the NH3 concentration in the discrete substrate element 52(*i*) at a previous timestep;

[NH3]$_{in}$ is the NH3 concentration at the inlet to the discrete substrate element 52(*i*);

$T_{sub}$ is the substrate temperature of the discrete substrate element 52(*i*); $\Delta t$ is the time period;

$\theta_{NH3}$ is the ammonia storage concentration for the discrete substrate element 52(*i*);

$t_{resident}$ is the gas resident time, which can be determined based upon the volume of the discrete substrate element 52(*i*) and the volumetric flowrate of the exhaust gas feedstream; and $\Omega$ is a specific ammonia storage capacity for the discrete substrate element 52(*i*), which is preferably stored in the control module 10, and is considered a constant. The specific ammonia storage capacity can be in any suitable units of measure, including, e.g., mass, volume, or moles, and is preferably consistent with other measurements and estimates of ammonia storage capacity.

With known states for each of the aforementioned parameters, i.e., [NH3]$_{in}$, [NH3]$_{-\Delta t}$, $\Delta$[NH3]$_{desorption}$, $T_{sub}$, $\theta_{NH3}$, and $t_{resident}$ the amount of ammonia that is adsorbed in the discrete substrate element 52(*i*), i.e., $\Delta$[NH3]$_{adsorption}$ can be determined.

The amount of ammonia that is desorbed, i.e., $\Delta$[NH3]$_{desorption}$ (120), i.e., an ammonia desorption rate, can be determined using the specific ammonia storage capacity for the discrete substrate element 52(*i*) $\Omega$, the residence time $t_{resident}$, and the ammonia storage concentration ($\theta_{NH3}$) for the discrete substrate element 52(*i*) in combination with a predetermined desorption term $F_{table\_desorp}(T_{sub}, \theta_{NH3})$ as set forth below in Eq. 4. The predetermined desorption term $F_{table\_desorp}(T_{sub}, \theta_{NH3})$ is selected from a predetermined array of values stored in a memory lookup table, and is associated with the substrate temperature $T_{sub}$ and ammonia storage concentration ($\theta_{NH3}$) for the discrete substrate element 52(*i*).

$$\Delta[NH3]_{desorption} = F_{table\_desorp}(T_{sub}, \theta_{NH3}) * \theta_{NH3} * \Omega * t_{resident} \quad [4]$$

The amount of ammonia that is oxidized, i.e., $\Delta$[NH3]$_{oxidation}$ (125), i.e., an ammonia oxidation rate, can be determined in accordance with the following relationship:

$$\Delta[NH3]_{oxidation} = \Delta[NH3]_{oxid\_N_2} + \Delta[NH3]_{oxid\_NO} + \Delta[NH3]_{oxid\_N_2O} \quad [5]$$

The terms of Eq. 5 include an amount of ammonia oxidized in forming nitrogen, i.e., $\Delta$[NH3]$_{oxid\_N_2}$, an amount of ammonia oxidized in forming NO, i.e., $\Delta$[NH3]$_{oxid\_NO}$, and an amount of ammonia oxidized in forming N$_2$O, i.e., $\Delta$[NH3]$_{oxid\_N_2O}$, which can be determined as described below. The aforementioned terms include predetermined oxidation terms $F_{table\_oxid\_N_2}$, $F_{table\_oxid\_NO}$ and $F_{table\_oxid\_N_2O}$ that are selected from corresponding predetermined arrays that are preferably stored in tabular form in the control module 10. Specific values for each of the predetermined oxidation terms correspond to the substrate temperature $T_{sub}$ and ammonia storage concentration ($\theta_{NH3}$) for the discrete substrate element 52($i$) in accordance with the following relationships:

[6]

$$\Delta[NH3]_{oxid\_N_2} = F_{table\_oxid\_N_2}(T_{sub}, \theta_{NH3})*[O_2]*\Omega*t_{resident} \quad (A)$$

$$\Delta[NH3]_{oxid\_NO} = F_{table\_oxid\_NO}(T_{sub}, \theta_{NH3})*[O_2]*\Omega*t_{resident} \quad (B)$$

$$\Delta[NH3]_{oxid\_N_2O} = F_{table\_oxid\_N_2O}(T_{sub}, \theta_{NH3})*[O_2] \Omega*t_{resident} \quad (C)$$

wherein
- [$O_2$] is oxygen concentration,
- $t_{resident}$ is a gas resident time in the discrete substrate element 52($i$),
- $\theta_{NH3}$ is the ammonia storage concentration, and
- $\Omega$ is the specific ammonia storage capacity for the discrete substrate element 52($i$).

The three oxidation reactions set forth in Eq. 6 correspond to oxidation rates related to (A) $\Delta[NH3]_{oxid\_N2}$ and (B) $\Delta[NH3]_{oxid\_NO}$ of Eq. 1, respectively, to represent an amount of ammonia that is consumed thereby.

The amount of ammonia that is consumed for NOx reduction (130), i.e., an ammonia conversion rate, can be determined in accordance with the following relationship.

[7]

$$\Delta[NH3]_{NOx\_conversion} = \left\{[NO_X]_{in} + \frac{t_{resident}}{\Delta t}[NO_X]_{-\Delta t} + \Delta[NH3]_{oxid\_NO}\right\} \times$$

$$\{(1-R_{NO_2})[1-(1-\eta_{NO_X})(1-\eta_{NO})] + \quad (A)$$

$$\frac{4}{3}[R_{NO_2} - \eta_{NO_X}(1-R_{NO_2})]\eta_{NO_2} + \quad (B)$$

$$\eta_{NO_X}(1-R_{NO_2})\} \quad (C)$$

The terms set forth in Eq. 7 include reduction efficiency terms $\eta_{NO}$, $\eta_{NO_2}$, and $\eta_{NOx}$ that indicate efficiencies associated with consumption of ammonia in reducing NO, $NO_2$, and $NO_x$, respectively. The aforementioned efficiency terms are determined in accordance with the following relationships:

$$\eta_{NO} = F_{table\_NO}(T_{sub}, \zeta_{NO})$$

$$\zeta_{NO} = f_{table\_O2\_NO}([O_2])f_{table\_\theta abl}(\theta_{NH3})*\Omega*t_{resident}\Big/\left(1 + \frac{t_{resident}}{\Delta t}\right)$$

$$\eta_{NO_2} = F_{table\_NO_2}(T_{sub}, \zeta_{NO2})$$

$$\zeta_{NO2} = f_{table\_\theta abl2}(\theta_{NH3})*\Omega*t_{resident}\Big/\left(1 + \frac{t_{resident}}{\Delta t}\right)$$

$$\eta_{NOx} = F_{table\_NOx}(\eta_{NO_x\_2}, R_{NO_2})$$

$$\eta_{NO_x\_2} = f_{table\_NO_x\_2}(\eta_{NO_x\_1}, [NO_x]_{aver}*(1-\eta_{NO})*(1-\eta_{NO_2}))$$

$$\eta_{NO_x\_1} = f_{table\_NO_x\_1}(T_{sub}, \zeta_{NOx})$$

$$\zeta_{NOx} = f_{table\_\theta ablx}(\theta_{NH3})\Omega t_{resident}\Big/\left(1 + \frac{t_{resident}}{\Delta t}\right)$$

wherein $$[NO_x]_{aver} = \frac{[NO_x]_{aver}\left([NO_x]_{in} + \frac{t_{resident}}{\Delta t}[NO_x]_{-\Delta t} + \Delta[NH3]_{oxid\_NO}\right)}{\left(1 + \frac{t_{resident}}{\Delta t}\right)}$$

$$R_{NO_2} = \frac{\left([NO_2]_{in} + \frac{t_{resident}}{\Delta t}[NO_2]_{-\Delta t}\right)}{\left([NO_x]_{in} + \frac{t_{resident}}{\Delta t}[NO_x]_{-\Delta t} + \Delta[NH3]_{oxid\_NO}\right)}$$

$$[NO_x]_{in} = [NO]_{in} + [NO_2]_{in}$$

$$[NO_x]_{-\Delta t} = [NO]_{-\Delta t} + [NO_2]_{-\Delta t}$$

The term $R_{NO_2}$ denotes a ratio of $NO_2$/NOx in the incoming gas feedstream. The reduction efficiency terms $\eta_{NO}$, $\eta_{NO_2}$, and $\eta_{NOx}$ change with substrate temperature $T_{sub}$ and consumption capacities of the substrate element 52 associated with NO, $NO_2$, and $NO_x$, respectively, which are expressed as terms $\zeta_{NO}$, $\zeta_{NO2}$, and $\zeta_{NOx}$, respectively. Each of the consumption capacity terms associated with the discrete substrate element 52($i$), i.e., $\zeta_{NO}$, $\zeta_{NO2}$, and $\zeta_{NOx}$ is calculated as a function of residence time $t_{resident}$, specific ammonia storage capacity $\Omega$, and a related scaling term, i.e., $f_{table\_\theta\_NO2}(\theta_{NH3})$, $f_{table\_\theta\_NOx}(\theta_{NH3})$, $f_{table\_\theta\_NO}(\theta_{NH3})$ and $f_{table\_O2\_NO}([O_2])$, each of which is a function of either the ammonia storage concentration ($\theta_{NH3}$) or the oxygen concentration ($O_2$). As is appreciated, the consumption capacities of the substrate element 52 are based upon a relationship between the ammonia storage concentration ($\theta_{NH3}$), ammonia storage capacity $\Omega$, and residence time $t_{resident}$ of the exhaust gas in the discrete substrate element 52($i$). The consumption capacities of the substrate element 52 associated with NO, $NO_2$, and $NO_x$, i.e., $\zeta_{NO}$, $\zeta_{NO2}$, and $\zeta_{NOx}$, respectively, are preferably predetermined and stored as arrays in tabular form in the control module 10.

The reduction efficiency terms associated with NO, $NO_2$, and $NO_x$, i.e., $\eta_{NO}$, $\eta_{NO_2}$, and $\eta_{NOx}$, respectively, are selected from predetermined arrays that are preferably stored in tabular form in the control module 10. The predetermined arrays are searchable in terms of the substrate temperature $T_{sub}$ and the corresponding consumption capacity of the substrate, i.e., one of $\zeta_{NO}$, $\zeta_{NO2}$, and $\zeta_{NOx}$.

Thus, the ammonia storage concentration ($\theta_{NH3}$) can be determined (140) in accordance with the following relationship:

$$\theta_{NH3,t} = \theta_{NH3,t-\Delta t} + (\Delta[NH3]_{adsorption} - \Delta[NH3]_{desorption} - \Delta[NH3]\text{oxidation} - \Delta[NH3]\text{NOx\_conversion}\Delta t\Omega t_{resident} \quad [8]$$

wherein
- $\Delta[NH3]_{adsorption}$ includes an amount of ammonia adsorbed into a catalyst surface per volume of gases passing through the discrete substrate element 52($i$),
- $\Delta[NH3]_{desorption}$ includes an amount of ammonia desorbed from catalyst surface per volume of gases passing through the discrete substrate element 52($i$),
- $\Delta[NH3]_{oxidation}$ includes an amount of ammonia oxidized per volume of gases passing through the discrete substrate element 52($i$), and
- $\Delta[NH3]_{NOx\_conversion}$ includes an amount of ammonia consumed for NOx reduction per volume of gases passing through the discrete substrate element 52($i$).

The chemical species concentrations for the discrete substrate element 52($i$) can be determined for NO, $NO_2$, ammonia, and $N_2O$ concentrations in accordance with the following relationships.

$$[NO] = \frac{(1-R_{NO_2})(1-\eta_{NO_x})(1-\eta_{NO})\left([NO_x]_{in} + \frac{t_{resident}}{\Delta t}[NO_x]_{-\Delta t} + \Delta[NH3]_{oxid\_NO}\right)}{\left(1 + \frac{t_{resident}}{\Delta t}\right)} \quad [9]$$

-continued $$[NO_2] = \frac{\left([NO_x]_{in} + \frac{t_{resident}}{\Delta t}[NO_x]_{-\Delta t}\right)[R_{NO_2} - \eta_{NO_x}(1 - R_{NO_2})](1 - \eta_{NO_2})}{\left(1 + \frac{t_{resident}}{\Delta t}\right)} \quad [10]$$

$$[NH3] = \frac{\left([NH3]_{in} + \frac{t_{resident}}{\Delta t}[NH3]_{-\Delta t} + \Delta[NH3]_{desorption}\right)(1 - \eta_{adsorption})}{\left(1 + \frac{t_{resident}}{\Delta t}\right)} \quad [11]$$

$$[N_2O] \frac{\left([N_2O]_{in} + \frac{t_{resident}}{\Delta t}[N_2O]_{-\Delta t} + \Delta[N_2O]\right)}{\left(1 + \frac{t_{resident}}{\Delta t}\right)} \quad [12]$$

wherein $[NO]_{-\Delta t}$, $[NO_2]_{-\Delta t}$, $[N_2O]_{-\Delta t}$ and $[NH3]_{-\Delta t}$ are the concentration values in the discrete substrate element 52($i$) defined at the previous timestep for NO, NO$_2$, and N$_2$O.

$$\Delta[N_2O] = \Delta[NH3]_{oxid\_N_2O} + \Delta[N_2O]_{NO_2} + \Delta[N_2O]_{NO} \quad [13]$$

$$\Delta[N_2O]_{NO} = \Delta[NO]_{in}(1-\eta_{NO_x})\eta_{NO}\gamma_{table\_NO\_N_2O}(T_{sub}) \quad [14]$$

$$\Delta[N_2O]_{NO_2} = ([NO_2]_{in} - \eta_{NO_x}[NO]_{in})\eta_{NO_2}\gamma_{table\_NO_2\_N_2O}(T_{sub}) \quad [15]$$

wherein $\gamma_{table\_NO\_N_2O}$ and $\gamma_{table\_NO_2\_N_2O}$ are reaction rate terms that are selected from a predetermined array that is stored in tabular form in the control module 10. A specific value for each of the reaction rate terms is retrievable as a function of the substrate temperature $T_{sub}$.

Thus, the virtual sensor 55 can be used to determine ammonia storage concentration ($\theta_{NH3}$) for the entire coated substrate 52 by sequentially determining a change in ammonia storage for each of the discrete substrate elements in a stepwise fashion for each of the discrete substrate elements 52($i$), $i=1$ through n, over a time period, and determining the ammonia storage concentration ($\theta_{NH3}$) on the ammonia-selective catalyst reduction device corresponding to the change in ammonia storage for the discrete substrate elements 52($i$).

Figures 3, 4:
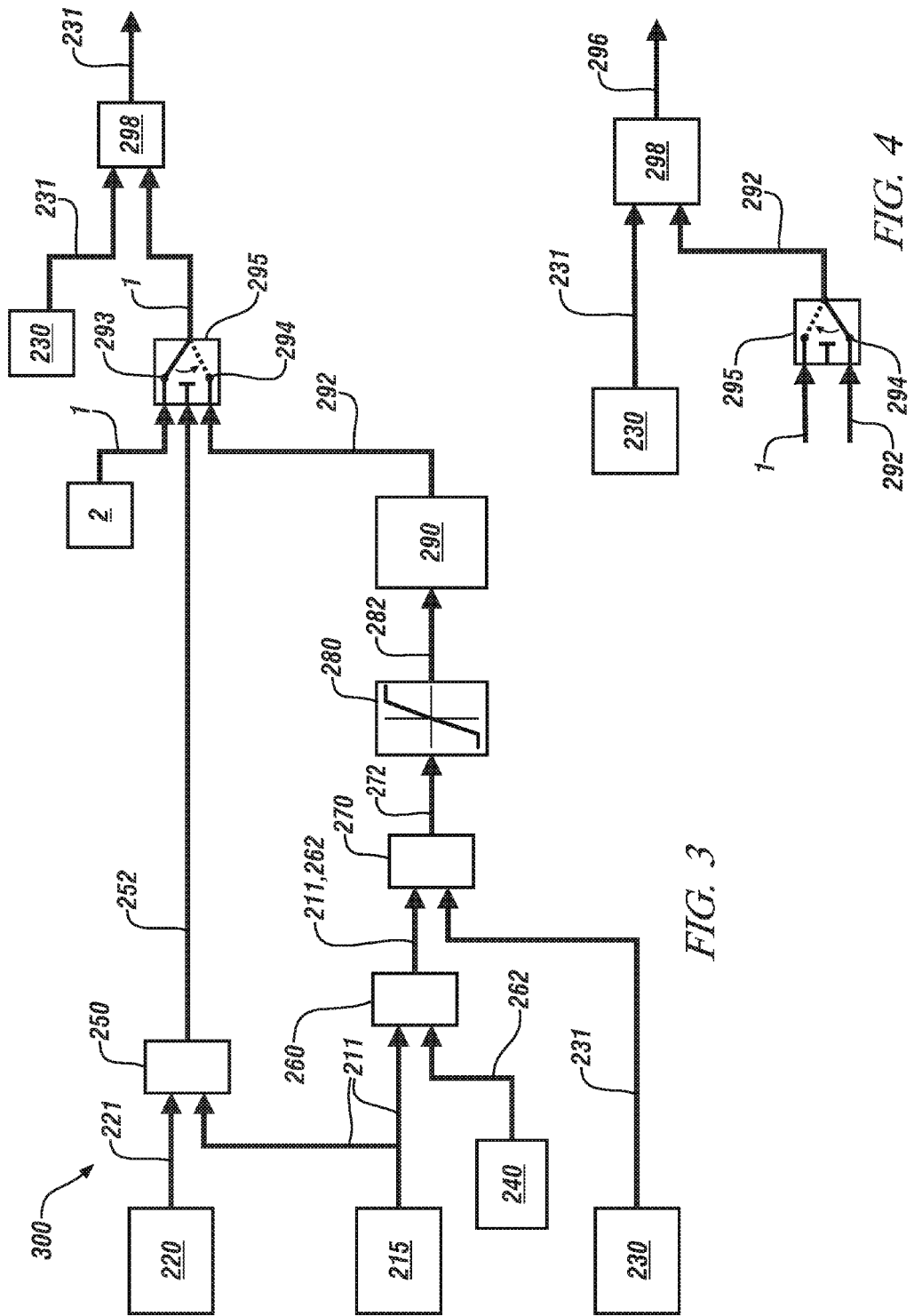
FIGS. 3 and 4 illustrates a model for maintaining or adjusting a determined amount of ammonia consumption for a discrete substrate element per volume of gases passing through the discrete substrate element, in accordance with the present disclosure.

FIGS. 3 and 4 illustrate a model 300 for maintaining or adjusting a determined amount of ammonia consumption ($\Delta[NH3]_{consumption}$) for the discrete substrate element 52($i$) per volume of gases passing through the discrete substrate element 52($i$). As aforementioned, the discrete substrate element 52($i$) is one of a plurality of discrete substrate elements 52($n$) analytically segmented from the ammonia-selective catalytic reduction (SCR) device 60 of FIG. 1. The $\Delta[NH3]_{consumption}$ can also be described as an ammonia consumption rate for the discrete substrate element 52($i$) per volume of gases passing through the discrete substrate element 52($i$). Discussed in greater detail below, the $\Delta[NH3]_{consumption}$ is based on the $\Delta[NH3]_{oxidation}$ (see Eq. [5]) and the $\Delta[NH3]_{NOx\_conversion}$ (see Eq. [7]).

The model 300 is integrated within the virtual sensor 55 of the control module 10. The model 300 includes an ammonia adsorption module 215, an ammonia desorption module 220 and an ammonia consumption module 230. The model 300 further includes an integer unit 240, first and second comparison units 250, 260, respectively, a divider unit 270, a limiter module 280, an adjustment module 290, a maintaining module 2, a switch module 295 and a multiplication module 298.

The ammonia adsorption module 215 monitors an amount of ammonia adsorbed ($\Delta[NH3]_{adsorbed}$ 211) onto the surface of each discrete substrate element 52($i$) per volume of gases passing through the discrete substrate element 52($i$). The monitored $\Delta[NH3]_{adsorbed}$ 211 can be determined in block 115 of flowchart 100 utilizing Equation [2].

The ammonia desorption module 220 monitors an amount of ammonia desorbed ($\Delta[NH3]_{desorbed}$) 221 from the surface of each discrete substrate element 52($i$) per volume of gases passing through the discrete substrate element 52($i$). The monitored $\Delta[NH3]_{desorbed}$ 221 can be determined in block 120 of flowchart 100 utilizing Equation [4].

The ammonia consumption module 230 monitors an amount of ammonia consumption $\Delta[NH3]_{consumption}$ 231 for the discrete substrate element 52($i$) per volume of gases passing through the discrete substrate element 52($i$). The ammonia consumption module 230 can determine the $\Delta[NH3]_{consumption}$ 231 based on calculating a sum of the $\Delta[NH3]_{oxidation}$ and the $\Delta[NH3]_{NOx\_conversion}$. As aforementioned, the $\Delta[NH3]_{oxidation}$ can be determined in block 125 of flowchart 100 utilizing Eq. [5] and the $\Delta[NH3]_{NOx\_conversion}$ can be determined in block 130 of flowchart 100 utilizing Eq. [7]

It will be appreciated that the amount of ammonia adsorbed $\Delta[NH3]_{adsorbed}$ 211 can interchangeably be referred to as an ammonia adsorption rate, the amount of ammonia desorbed $\Delta[NH3]_{desorbed}$ 221 can interchangeably be referred to as an ammonia desorption rate, the amount of ammonia that is oxidized $\Delta[NH3]_{oxidation}$ can interchangeably be referred to as an ammonia oxidation rate, the amount of ammonia consumed in reducing NOx in the exhaust gas feedstream $\Delta[NH3]_{NOx\_conversion}$ can interchangeable be referred to as an ammonia conversion rate and the amount of ammonia consumption $\Delta[NH3]_{consumption}$ 231 can interchangeably be referred to as an ammonia consumption rate.

The first comparison unit 250 compares the $\Delta[NH3]_{adsorbed}$ 211 and the $\Delta[NH3]_{desorbed}$ 221 for each discrete substrate element 52($i$). As will become apparent, with reference to FIG. 4, the amount of ammonia consumption (i.e., ammonia consumption rate) $\Delta[NH3]_{consumption}$ 231 for each discrete substrate element 52($i$) can be adjusted to determine an adjusted amount of ammonia consumption (i.e., adjusted ammonia consumption rate) 296 when the $\Delta[NH3]_{adsorbed}$ 211 is less than the $\Delta[NH3]_{desorbed}$ 221. On the other hand, with reference to FIG. 3, the $\Delta[NH3]_{consumption}$ 231 for each discrete element 52($i$) can be maintained when the $\Delta[NH3]_{adsorbed}$ 211 is at least the $\Delta[NH3]_{desorbed}$ 221.

Situations during operation of the ammonia-SCR device 60 can arise that may result in the amount of ammonia that is adsorbed to be less than the amount of ammonia that is desorbed. In one embodiment, the amount of ammonia that is adsorbed can be less than the amount of ammonia that is desorbed when urea dosing or ammonia dosing from the dosing device 20 is momentarily stopped or terminated. Inaccuracies to the determined amount of ammonia consumption (i.e., sum of $\Delta[NH3]_{oxidation}$ and $\Delta[NH3]_{NOx\_conversion}$) may result when the amount of ammonia that is adsorbed is less than the amount of ammonia that is desorbed. Specifically, the amount of ammonia consumption $\Delta[NH3]_{consumption}$ 231 for each discrete substrate element 52($i$) can deviate by an increased magnitude from an actual amount of ammonia consumption for each discrete substrate element 52($i$) when the amount of ammonia that is adsorbed is less than the amount of ammonia that is desorbed. As evidenced by block 140 of flowchart 100, a determined amount of ammonia consumption that deviates from an actual amount of ammonia consumption would result in an inaccurate ammonia storage concentration ($\theta_{NH3}$) in each discrete substrate element 52($i$) and an inaccurate total ammonia storage concentration on the ammonia-selective catalyst reduction device 60. Thus, an inaccurate $\theta_{NH3}$ can result in estimations of an amount of NOx at an outlet of each discrete substrate element $52(i)$ and an amount of NOx at an outlet of the ammonia-SCR device 60 deviating from measured NOx values at the respective outlets. If NOx estimations deviate from measured values, ammonia dosing or urea dosing rates cannot be accurately controlled, thereby increasing ammonia or urea consumption and diminishing efficiency of the ammonia-SCR device 60. Accordingly, a modification or adjustment to the virtual sensor 55 may be required to adjust the determined amount of ammonia consumption $\Delta[NH3]_{consumption}$ 231 to compensate for inaccuracies when the amount of ammonia that is adsorbed is less than the amount of ammonia that is desorbed.

When the $\Delta[NH3]_{adsorbed}$ 211 is less than the $\Delta[NH3]_{desorbed}$ 221, the $\Delta[NH3]_{adsorbed}$ 211 is input to the second comparison unit 260. In one embodiment, a determination that the $\Delta[NH3]_{adsorbed}$ 211 is less than the $\Delta[NH3]_{desorbed}$ 221 is indicative of a situation where urea dosing or ammonia dosing by the urea dosing device 20 has momentarily stopped or has been terminated.

If the second comparison unit 260 determines the $\Delta[NH3]_{adsorbed}$ 211 has a value greater than zero, the $\Delta[NH3]_{adsorbed}$ 211 is input to the divider unit 270. If the second comparison unit 260 determines the $\Delta[NH3]_{adsorbed}$ 211 has a value equal to zero, a predetermined non-zero integer 262 provided by the integer unit 240 is input to the divider unit 270 in place of the $\Delta[NH3]_{adsorbed}$ 211. In other words, when the $\Delta[NH3]_{adsorbed}$ 211 is equal to zero, the $\Delta[NH3]_{adsorbed}$ 211 is designated to be equal to the predetermined non-zero integer 262. In a non-limiting example, the predetermined non-zero integer 262 has a value equal to 1.0 e-10.

The divider unit 270 receives the $\Delta[NH3]_{adsorbed}$ 211 and the $\Delta[NH3]_{consumption}$ 231 and divides the $\Delta[NH3]_{consumption}$ 231 by the $\Delta[NH3]_{adsorbed}$ 211 to determine a ratio 272 for each discrete substrate element $52(i)$. As aforementioned, the $\Delta[NH3]_{adsorbed}$ 211 can be designated to be equal to the predetermined non-zero integer 262 when the $\Delta[NH3]_{adsorbed}$ 211 is equal to zero. Hence, the divider unit 270 determines a ratio 272 of the amount of ammonia consumption (i.e., ammonia consumption rate) 231 to the amount of ammonia that is adsorbed (i.e., ammonia adsorption rate) 215 for each discrete substrate element $52(i)$.

In the exemplary embodiment, the ratio 272 can be input to the limiter module 280. The limiter module 280 can proportionally reduce the ratio 272 within a predetermined range defined by a minimum limit and a maximum limit. In a non-limiting example, the proportionally reduced predetermined range is defined by and includes a minimum limit equal to "0" and a maximum limit equal to "20." Accordingly, a reduced ratio 282 is provided by the limiter module 280 and is output to the adjustment module 290.

The adjustment module 290 is configured to determine an adjustment multiplier 292 based on the ratio (i.e., or the reduced ratio 282) of the amount of ammonia consumption (i.e., ammonia consumption rate) 231 to the amount of ammonia that is adsorbed (i.e., ammonia adsorption rate) 211. The adjustment multiplier 292 can be applied to the amount of ammonia consumption (i.e., ammonia consumption rate) 231 for each discrete substrate element $52(i)$ when the $\Delta[NH3]_{adsorbed}$ 211 is less than the $\Delta[NH3]_{desorbed}$ 221.

Referring to FIG. 4, the switch module 295 switches from a nominal state 293 to an adjustment state 294 when the first comparison unit 250 determines the $\Delta[NH3]_{adsorbed}$ 211 is less than the $\Delta[NH3]_{desorbed}$ 221. Accordingly, the adjustment multiplier 292 and the amount of ammonia consumption 231 can be input to the multiplication module 298 to determine the adjusted amount of ammonia consumption (i.e., adjusted ammonia consumption rate) 296.

Referring to FIG. 3, the nominal state 293 is selected or maintained when the first comparison unit 250 determines the $\Delta[NH3]_{adsorbed}$ 211 is at least the $\Delta[NH3]_{desorbed}$ 221. When the switch 295 is in the nominal state 293, a maintaining multiplier 1 output from the maintaining module 2 can be input to the multiplication module 298 along with the amount of ammonia consumption 231. It will be appreciated that the maintaining multiplier 1 has a value of "1." Accordingly, the amount of ammonia consumption 231 is maintained and is not multiplied or adjusted by the adjustment multiplier 292.

The adjustment multiplier 292 has a value between zero and one. Accordingly, the adjusted amount of ammonia consumption 296 is less than the determined amount of ammonia consumption 231. Likewise, the rate of change of the adjusted ammonia consumption rate 296 is less than the determined ammonia consumption rate 231. In other words, applying the adjustment multiplier 292 to the determined ammonia consumption rate 231 decreases the rate of change of the determined ammonia consumption rate 231.

The adjustment module 290 can include look-up tables for determining the adjustment multiplier 292. In an exemplary embodiment, the look-up table is a one-dimensional table having an input corresponding to the reduced ratio 282 and an output corresponding to the determined adjustment multiplier 292. In the exemplary embodiment, the one-dimensional table utilizes an equation for slope. In a non-limiting example, the equation for slope can be expressed as follows.

$$y = \frac{1}{2\sqrt{x} + 1} \qquad [16]$$

wherein x is an input including the reduced ratio 282, and y is an output including the adjustment multiplier 292.

It will be appreciated that Equation [16] is merely a non-limiting example for determining the adjustment multiplier 292, and that any equation can be calibrated to determine the adjustment multiplier 292.

As aforementioned, a determined amount of ammonia consumption 231 without being adjusted when the amount of ammonia that is adsorbed is less than the amount of ammonia that is desorbed for each discrete substrate element $52(i)$ would result in an inaccurate ammonia storage concentration ($\theta_{NH3}$) determination in each discrete substrate element $52(i)$ and an inaccurate total ammonia storage concentration on the ammonia-selective catalyst 60 (see block 140 of flowchart 100).

Accordingly, the states of parameters of the exhaust gas feedstream upstream of each discrete substrate element $52(i)$ (e.g., input gases 50 of FIG. 1) can be monitored and the ammonia storage concentration $\theta_{NH3}$ for each discrete substrate element $52(i)$ can be determined based on the amount of ammonia that is adsorbed 211, the amount of ammonia that is desorbed 221 and the adjusted amount of ammonia consumption 296 when the amount of ammonia that is adsorbed 211 is less than the amount of ammonia that is desorbed 221. An amount of NOx at an outlet each discrete substrate element $52(i)$ can be estimated based on the determined ammonia storage concentration and the monitored states of parameters of the exhaust gas feedstream upstream of the ammonia-selective catalyst reduction device. Likewise, a total ammonia storage concentration on the ammonia-selective catalyst reduction device 60 can be determined based on the sequentially calculated ammonia adsorption rate 211, the ammonia desorption rate 221 and the adjusted ammonia consumption rate 296 when the ammonia adsorption rate 211 is less than the ammonia desorption rate 221; or the total ammonia storage concentration on the ammonia-selective catalyst reduction device 60 can be determined based on the sequentially calculated ammonia adsorption rate 211, the ammonia desorption rate 221 and the determined ammonia consumption rate 231 when the ammonia adsorption rate 211 is at least the ammonia desorption rate 221. An amount of NOx at an outlet of the ammonia-selective catalyst reduction device 60 can be estimated based on the total ammonia storage concentration on the ammonia-selective catalyst reduction device 60.

Figure 5:
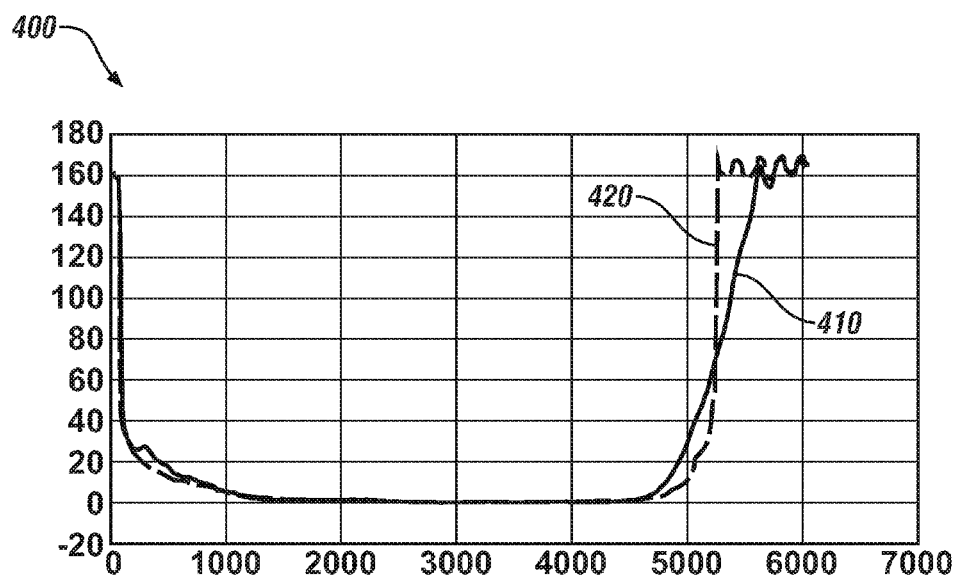
FIGS. 5 and 6 illustrate experimental and derived data of an exemplary ammonia-selective catalytic reduction (SCR) device, depicting an estimated amount of NOx at an outlet of the ammonia-SCR device and a measured amount of NOx at the outlet of the ammonia-SCR device over a period of time, in accordance with the present disclosure.
Figure 6:
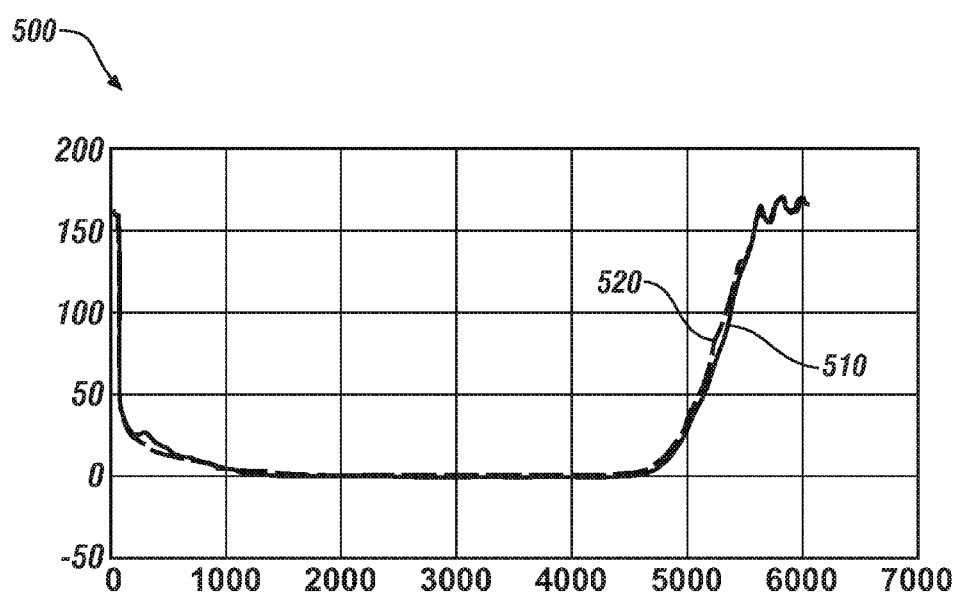

FIGS. 5 and 6 illustrate experimental and derived data of an exemplary ammonia-selective catalytic reduction (SCR) device, depicting an estimated amount of NOx at an outlet of the ammonia-SCR device and a measured amount of NOx at the outlet of the ammonia-SCR device over a period of time in accordance with the present disclosure. The horizontal axis in each of FIGS. 4 and 5 represents time in seconds. The vertical axis in each of FIGS. 4 and 5 represents NOx concentration in ppm.

With reference to FIG. 5, plot 400 illustrates a profile of an estimated amount of NOx 420 at the outlet of the ammonia-SCR device and a profile 410 of a measured amount of NOx 410 at the outlet of the ammonia-SCR device. At about 4500 seconds a condition occurs resulting in an amount of ammonia that is adsorbed on a catalyst surface being less than an amount of ammonia that is desorbed on the catalyst surface. For instance, ammonia or urea dosing may have been momentarily stopped or terminated. As a result, the profile of the estimated amount of NOx 420 sharply increases and deviates from the profile of the measured amount of NOx 410. This deviation is a result of an inaccurate amount of ammonia consumption determined when the amount of ammonia that is adsorbed on the catalyst surface is less than the amount of ammonia that is desorbed on the catalyst surface.

With reference to FIG. 6, plot 500 illustrates a profile of an estimated amount of NOx 520 at the outlet of the ammonia-SCR device and a profile 510 of a measured amount of NOx 410 at the outlet of the ammonia-SCR device. At about 4500 seconds a condition occurs resulting in an amount of ammonia that is adsorbed on a catalyst surface being less than an amount of ammonia that is desorbed on the catalyst surface. As evidenced by plot 500, when an amount of ammonia consumption is adjusted when the amount of ammonia that is adsorbed on the catalyst surface is less than the amount of ammonia that is desorbed on the catalyst surface, the profile of the estimated amount of NOx 520 closely follows the profile of the measured amount of NOx 510.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a discrete substrate element from an ammonia-selective catalyst reduction device configured to treat an exhaust gas feedstream of an internal combustion engine, comprising:
   monitoring an amount of ammonia that is adsorbed, an amount of ammonia that is desorbed, an amount of ammonia that is oxidized and an amount of ammonia that is consumed in reducing NOx in the exhaust gas feedstream for the discrete substrate element;
   determining an amount of ammonia consumption for the discrete substrate element based on the amount of ammonia that is oxidized and the amount of ammonia that is consumed in reducing NOx in the exhaust gas feedstream;
   comparing the amount of ammonia that is adsorbed and the amount of ammonia that is desorbed for the discrete substrate element; and
   adjusting the amount of ammonia consumption for the discrete substrate element when the amount of ammonia that is adsorbed is less than the amount of ammonia that is desorbed and injecting urea using a urea injection device based upon the adjusted amount of ammonia consumption.

2. The method of claim 1 wherein the discrete substrate element comprises one of a plurality of discrete substrate elements analytically segmented from the ammonia-selective catalytic reduction device.

3. The method of claim 1 further comprising:
   monitoring exhaust gas feedstream parameters upstream of the discrete substrate element;
   determining an ammonia storage concentration for the discrete substrate element based on the amount of ammonia that is adsorbed, the amount of ammonia that is desorbed and the adjusted amount of ammonia consumption; and
   estimating an amount of NOx at an outlet of the discrete substrate element based on the determined ammonia storage concentration and the exhaust gas feedstream parameters upstream of the ammonia-selective catalyst reduction device.

4. The method of claim 1 further comprising:
   maintaining the amount of ammonia consumption for the discrete substrate element when the amount of ammonia that is adsorbed is at least the amount of ammonia that is adsorbed.

5. The method of claim 1 wherein the amount of ammonia consumption is determined based on calculating a sum of the amount of ammonia that is oxidized and the amount of ammonia that is consumed in reducing NOx in the exhaust gas feedstream.

6. The method of claim 1 wherein adjusting the amount of ammonia consumption for the discrete substrate element is based on a ratio of the amount of ammonia consumption to the amount of ammonia that is adsorbed.

7. The method of claim 6, further comprising:
   when the monitored amount of ammonia that is adsorbed is equal to zero, designating the monitored amount of ammonia that is adsorbed to be equal to a predetermined non-zero integer.

8. The method of claim 6 wherein the ratio of the amount of ammonia consumption to the amount of ammonia that is adsorbed is proportionally reduced within a predetermined range.

9. The method of claim 6 wherein the adjusted amount of ammonia consumption is less than the determined amount of ammonia consumption.

10. The method of claim 6 wherein adjusting the amount of ammonia consumption for the discrete substrate element based on the ratio of the amount of ammonia consumption to the amount of ammonia that is adsorbed comprises:
    determining an adjustment multiplier based on the ratio of the amount of ammonia consumption to the amount of ammonia that is adsorbed; and
    applying the adjustment multiplier to the amount of ammonia consumption for the discrete substrate element.

11. The method of claim 10 wherein the adjustment multiplier is a value between zero and one.

* * * * *